US009108534B2

(12) United States Patent
Hoshi et al.

(10) Patent No.: US 9,108,534 B2
(45) Date of Patent: Aug. 18, 2015

(54) VEHICLE SEAT

(75) Inventors: Masayuki Hoshi, Tochigi (JP); Yuusuke Satou, Aichi (JP); Mitsunobu Nishioka, Aichi (JP); Takuto Esaki, Aichi (JP)

(73) Assignees: TS TECH CO., LTD., Saitama (JP); IMASEN ELECTRIC INDUSTRIAL CO., LTD., Aichi (JP)

( * ) Notice: Subject to any disclaimer, the term of this patent is extended or adjusted under 35 U.S.C. 154(b) by 138 days.

(21) Appl. No.: 13/877,866

(22) PCT Filed: Oct. 12, 2010

(86) PCT No.: PCT/JP2010/067855
§ 371 (c)(1),
(2), (4) Date: Apr. 4, 2013

(87) PCT Pub. No.: WO2012/049725
PCT Pub. Date: Apr. 19, 2012

(65) Prior Publication Data
US 2013/0193296 A1 Aug. 1, 2013

(51) Int. Cl.
*F16M 13/00* (2006.01)
*B60N 2/07* (2006.01)
(Continued)

(52) U.S. Cl.
CPC ............ *B60N 2/0722* (2013.01); *B60N 2/0705* (2013.01); *B60N 2/075* (2013.01); *B60N 2/0715* (2013.01); *B60N 2/0732* (2013.01); *B60N 2/165* (2013.01); *B60N 2/1615* (2013.01)

(58) Field of Classification Search
CPC .. B60N 2/0722; B60N 2/0705; B60N 2/0715; B60N 2/0732; B60N 2/1615; B60N 2/165; B60N 2/075

USPC .............. 248/424, 429, 419, 422; 297/344.1, 297/344.13, 344.14, 344.11
See application file for complete search history.

(56) References Cited

U.S. PATENT DOCUMENTS

| | | | | |
|---|---|---|---|---|
| 7,665,703 | B2 * | 2/2010 | Tanaka | 248/429 |
| 7,717,509 | B2 * | 5/2010 | Kojima | 297/216.2 |
| 8,646,742 | B2 * | 2/2014 | Hayashi et al. | 248/430 |

(Continued)

FOREIGN PATENT DOCUMENTS

| | | |
|---|---|---|
| JP | 62-85738 | 4/1987 |
| JP | 4-39128 | 4/1992 |

(Continued)

*Primary Examiner* — Amy Sterling
(74) *Attorney, Agent, or Firm* — Hamre, Schumann, Mueller & Larson, P.C.

(57) ABSTRACT

A vehicle seat slidable in a front-rear direction comprises a lower rail (5) fixed on a floor of a vehicle, and configured to have a shape elongated in the front-rear direction and having a groove (55) provided in a laterally central position, an upper rail (4) configured to be engageable with the groove (55) and slidable in the front-rear direction relative to the lower rail (5), and a seat bottom frame (3) fixed to the upper rail (4). The seat bottom frame (3) is fixed to a left or right side surface of the upper rail (4), the lower rail (5) has a pair of left and right top portions (53A, 53B) between which the groove (55) is disposed and of which the to inner top portion (53A) fixed to the seat bottom frame (3) is formed in a position lower than that of the outer top portion (53B) that is on a side opposite to the inner top portion (53A). A lower end (62C) of a rear link (62) that is an end of a seat bottom frame (3) facing to the inner top portion (53A) is in a position lower than that of the outer top portion (53B).

12 Claims, 6 Drawing Sheets

(51) Int. Cl.
   *B60N 2/16*   (2006.01)
   *B60N 2/075*  (2006.01)

(56)  References Cited

U.S. PATENT DOCUMENTS

| | | | |
|---|---|---|---|
| 8,814,122 B2* | 8/2014 | Couasnon | 248/429 |
| 2005/0109909 A1* | 5/2005 | Osawa et al. | 248/429 |
| 2006/0214460 A1* | 9/2006 | Kojima | 296/65.13 |
| 2010/0320352 A1* | 12/2010 | Weber | 248/429 |
| 2012/0018608 A1* | 1/2012 | Nishide et al. | 248/429 |

FOREIGN PATENT DOCUMENTS

| | | |
|---|---|---|
| JP | 2006-298086 | 11/2006 |
| JP | 2006-298252 | 11/2006 |
| JP | 2010-179688 | 8/2010 |

\* cited by examiner

VEHICLE SEAT

TECHNICAL FIELD

The present invention relates to a vehicle seat which is slidable in a front-rear direction.

BACKGROUND ART

A vehicle seat comprising a lower rail fixed to a vehicle body floor, and an upper rail inserted slidably in a front-rear direction into the lower rail and mounted to a seat cushion via a support frame fixed to an upper surface portion thereof whereby the vehicle seat is rendered slidable in the front-rear direction relative to the vehicle floor is hitherto known in the art (for example, see Patent Literature 1).

CITATION LIST

Patent Literature

Patent Literature 1: JP 2010-179688 A

SUMMARY OF INVENTION

Technical Problem

In recent years, the vehicle seat is required to be miniaturized in height. However, in a conventional configuration as described in Patent Literature 1, the seat cushion is mounted to the support frame fixed to the upper surface portion of the upper rail, and this configuration places a limitation on miniaturization in height of the seat.

With this in view, an object pursued by the present invention is to provide a vehicle seat which can be further miniaturized in height.

Solution to Problem

According to the present invention for attaining the aforementioned object, a vehicle seat slidable in a front-rear direction is provided which comprises: a lower rail fixed on a floor of a vehicle, and configured to have a shape elongated in the front-rear direction and having a groove provided in a laterally central position; an upper rail configured to be engageable with the groove and slidable in the front-rear direction relative to the lower rail; and a seat bottom fixed to the upper rail, wherein the seat bottom is fixed to a left or right side surface of the upper rail, wherein the lower rail has a pair of left and right upper surfaces between which the groove is disposed and of which a first surface is fixed to the seat bottom and a second surface is on a side opposite to the first surface, the first surface being formed in a position lower than that of the second surface, and wherein an end of the seat bottom facing to the first surface is in a position lower than that of the second surface.

With this configuration, in which the first surface of the lower rail is formed in a position lower than that of the second surface and the seat bottom fixed to the side surface of the upper rail has an end facing to the first surface which end is disposed in a position lower than that of the second surface, the height of the seat bottom can be lowered in comparison with the conventional configuration. Thus, further miniaturization in height can be achieved. Moreover, since the seat bottom is directly fixed to the side surface of the upper rail, the positioning accuracy in mounting the seat bottom can be improved in an upward/downward direction (in height) and in a lateral direction, in comparison with the configuration in which the seat bottom is fixed via a support frame or the like to the upper rail.

In the vehicle seat as described above, the seat bottom may be fixed to a laterally inner side surface of the upper rail.

With this configuration, a constituent part of the seat bottom can be arranged at an inner side surface of the upper rail, and thus miniaturization in a lateral dimension can be achieved. Moreover, the upper rail and the lower rail can be visually inspected from outside, and thus ease of maintenance can be improved.

In the vehicle seat as described above, the seat bottom may be configured to include a side frame which constitutes a left or right frame, and a link member which constitutes part of a height adjustment mechanism for adjusting a height of the side frame, the link member is connected to a side of the side frame, and the link member is fixed to the upper rail.

With this configuration, in which the link member is connected, not via a support frame or the like but directly, to the upper rail, the positioning accuracy in mounting the link member can be improved. Accordingly, the operational stability of the link member can be improved.

In the vehicle seat as described above, the upper rail may preferably be configured to include a sidewall to which the seat bottom is fixed, wherein at least part of the sidewall is formed with two sheet-like portions overlapping each other.

With this configuration, the rigidity of the upper rail can be enhanced, and thus the seat bottom can be fixed with stability. Moreover, in combination with the aforementioned configuration in which the link member of the height adjustment mechanism is fixed to the upper rail, the operational stability of the link member can be further improved.

Furthermore, the vehicle seat as described above may further comprise a fastening member with which the upper rail and the seat bottom are fixed together, wherein the upper rail includes a pair of sidewalls engageable with the groove, and a connecting wall connecting the pair of sidewalls, wherein at least part of the fastening member is disposed in a position lower than that of the connecting wall, and wherein the upper rail has a clearance that is a portion thereof recessed to avoid interference with the fastening member.

With this configuration, the height of the seat bottom can be further lowered, and thus further miniaturization in height can be achieved.

Advantageous Effects of Invention

With the configuration described in claim 1, the height of the seat bottom can be lowered, and thus further miniaturization in height can be achieved.

With the configuration described in claim 2, a constituent part of the seat bottom can be arranged at an inner side of the upper rail, and thus miniaturization in a lateral dimension can be achieved.

With the configuration described in claim 3, the positioning accuracy in mounting the link member can be improved, and thus the operational stability of the link member can be improved.

With the configuration described in claim 4, the rigidity of the upper rail can be enhanced, and thus the seat bottom can be fixed with stability.

With the configuration described in claim 5, the height of the seat bottom can be further lowered, and thus further miniaturization in height can be achieved.

DESCRIPTION OF EMBODIMENTS

Hereafter, a detailed description will be given of one embodiment of the present invention with reference made to the drawings where appropriate. It is to be understood that the front/rear, left/right (lateral) and upper/lower are defined as viewed from an occupant sitting on the seat.

Figure 1:
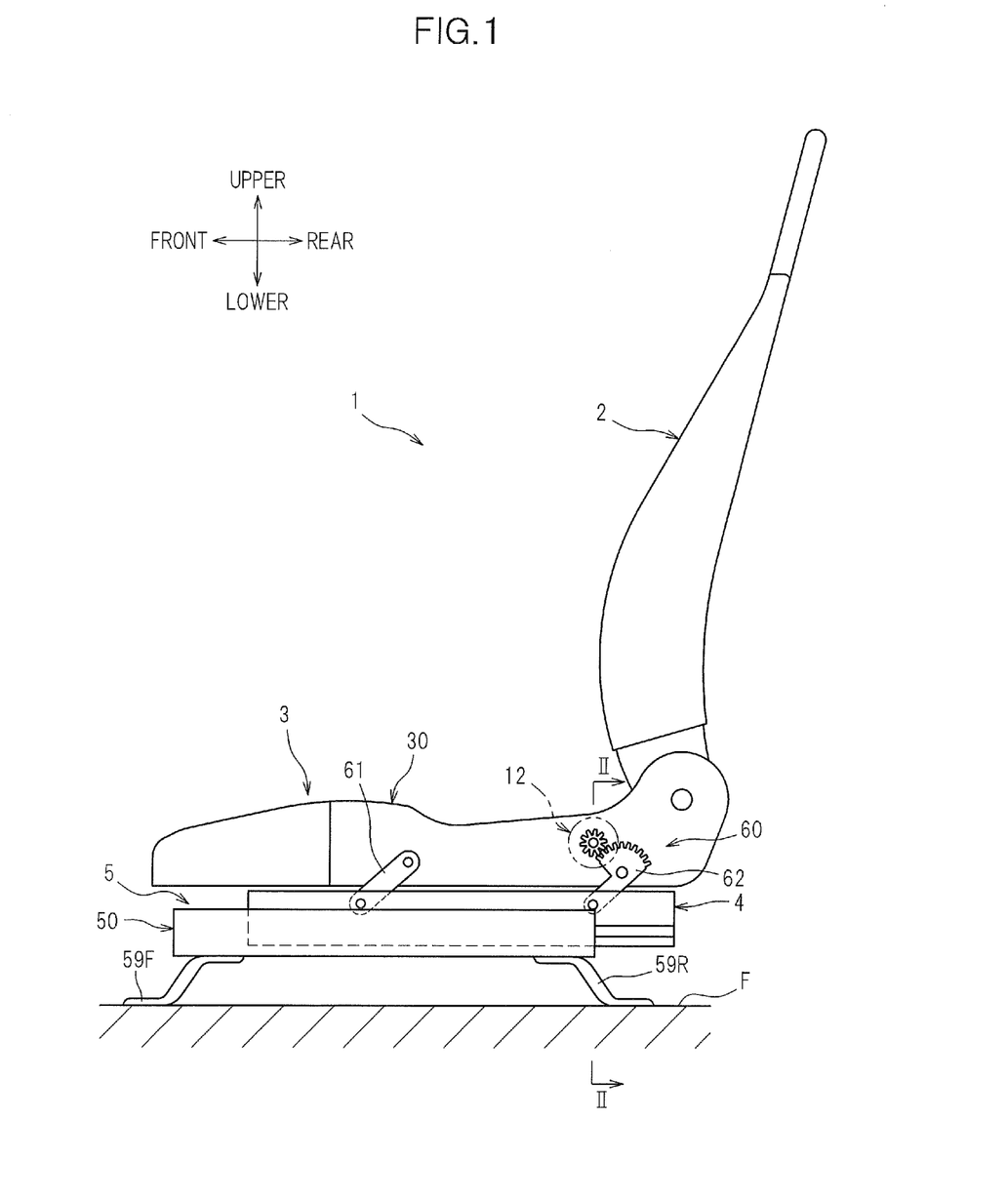
FIG. 1 is a side elevation of a vehicle seat according to one embodiment of the present invention.

As shown in FIG. 1, a car seat 1 as an example of the vehicle seat mainly includes a seat back frame 2, a seat bottom frame 3 which constitutes a frame of a seat bottom for an occupant to sit thereon, an upper rail 4, and a lower rail 5, and is configured to be slidable in a front-rear direction. The car seat 1 is further provided with a seat cushion (not shown) made of urethane foam or the like, with which the outsides of the seat back frame 2 and the seat bottom frame 3 are covered.

The lower rail 5 mainly includes a rail main body 50 elongated in the front-rear direction, a front bracket 59F and a rear bracket 59R, and is fixed to a floor F of a car (vehicle) by the front bracket 59F and the rear bracket 59R.

Figure 2:
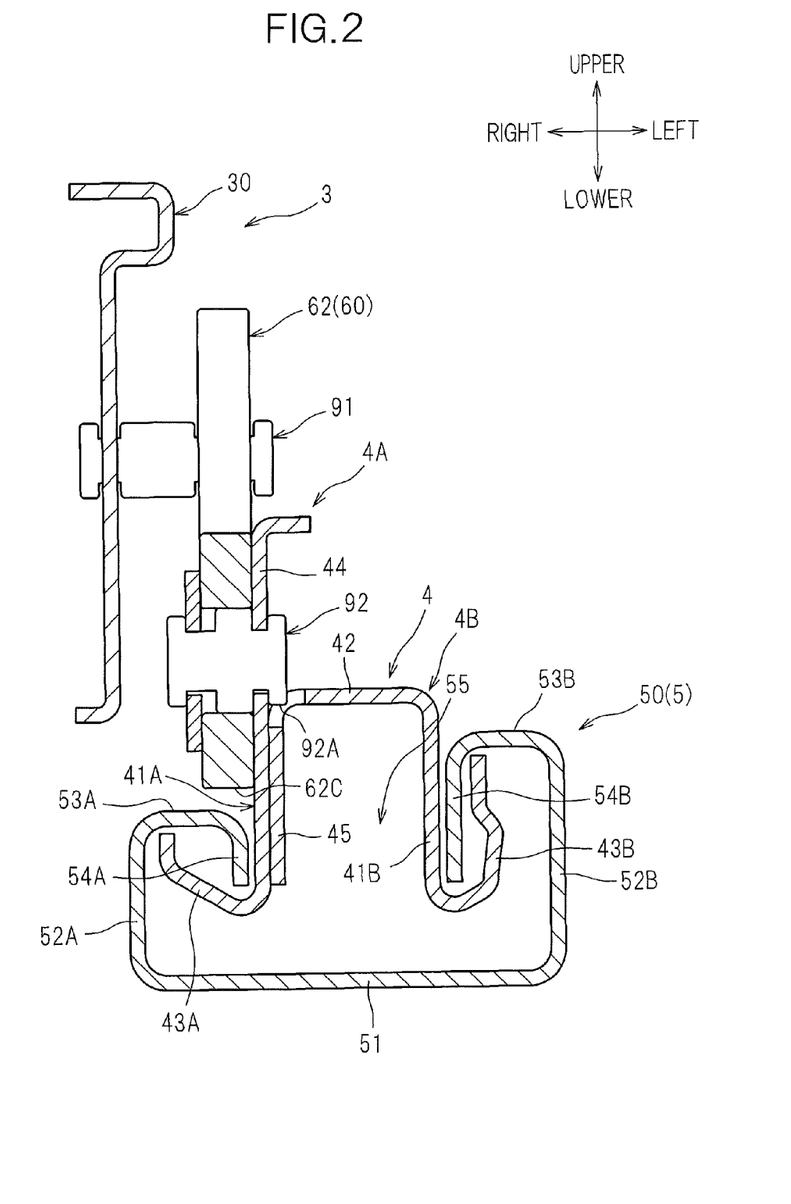
FIG. 2 is a sectional view taken along the line II-II of FIG. 1.

As shown in FIG. 2, the rail main body 50 is formed to have a substantially U-shaped cross section by bending a single metal sheet. To be more specific, the rail main body 50 includes a bottom portion 51, an inner side portion 52A and an outer side portion 52B raised upward from both of left and right ends of the bottom portion 51, an inner top portion 53A and an outer top portion 53B bent substantially horizontally to extend from upper ends of the respective side portions 52A, 52B toward inward, and an inner return portion 54A and an outer return portion 54B bent to extend from inner ends of the respective top portions 53A, 53B back toward downward.

The rail main body 50 has a groove 55 engageable with the upper rail 4 and disposed in a laterally central position as viewed from above, i.e., between the inner return portion 54 and the outer return portion 54B. In the present embodiment, the top portions 53A, 53B are formed to have lateral widths substantially equal to each other, and the return portions 54A, 54B are formed to have lower ends positioned at heights substantially equal to each other.

In the present embodiment, the rail main body 50 has a pair of left and right side upper surfaces between which the groove 55 is disposed, and which are provided on the inner top portion 53A and the outer top portion 53B, wherein the inner top portion 53A (first surface) that is on the laterally inner side (the right side to which the seat bottom frame 3 is fixed) is formed in a position lower than that of the outer top portion 53B (second surface) that is on the left side opposite to the inner top portion 53A.

Although not illustrated in the drawings, the lower rail 5 is provided in two positions, at the left and at the right, spaced apart at a predetermined distance. (In FIG. 2, the lower rail 5 disposed at the left in the seat bottom frame 3 is shown.) Two, left and right, lower rails 5 (rail main body 50) have a laterally symmetric cross section. To be more specific, the lower rail (not shown) disposed at the right in the seat bottom frame 3 is configured such that the inner top portion (first surface) that is on the left side (the laterally inner side) is in a position lower than that of the outer top portion (second surface) that is on the right side (laterally outer side).

The upper rail 4 is configured to have a shape elongated in the front-rear direction, and to be engageable with the groove 55 of the lower rail 5 and thereby slidable in the front-rear direction relative to the lower rail 5 (the floor F of the vehicle). In the present embodiment, the upper rail 4 is formed to have a substantially h-shape in cross section by bending two metal sheets individually to form an inner rail portion 4A and an outer rail portion 4B, and thereafter welding the inner rail portion 4A (mount wall portion 44) and the outer rail portion 4B (reinforcing wall portion 45) together, as will be described later.

To be more specific, the upper rail 4 includes an inner sidewall 41A (first sidewall) and an outer sidewall 41B (second sidewall) that are (a pair of sidewalls) engageable with the groove 55 of the lower rail 5, an upper wall 42 as an example of a connecting wall extending substantially horizontally to connect the sidewalls 41A, 41B (the inner sidewall 41 and the outer side wall 41B), an inner return portion 43A bent to extend from a lower end of the inner sidewall 41A (mount sidewall 44) inwardly (to the right) back toward upward, and an outer return portion 43B bent to extend from a lower end of the outer sidewall 41B outwardly (to the left) back toward upward. In a supplemental explanation, the aforementioned inner rail portion 4A constitutes the inner sidewall 41A and the inner return portion 43A, whereas the outer rail portion 4B constitutes the left and right sidewalls 41A, 41B, the upper wall 42, and the outer return portion 43B.

The inner sidewall 41A includes a sheet-like mount wall portion 44 for the seat bottom frame 3 to be fixed thereto, and a reinforcing wall portion 45 extending from an inner end of the upper wall 42 (an end at which the seat bottom frame 3 is fixed) downward, and substantially parallel to the outer sidewall 41B. The inner sidewall 41A is formed with at least a portion of the mount wall portion 44, to be more specific, a lower portion of the mount wall portion 44, and the reinforcing wall portion 45 overlapping each other which are welded to each other. In other words, at least part (lower portion) of the inner sidewall 41A (the sidewall to which the seat bottom frame 3 is fixed) of the upper rail 4 is formed with two sheet-like portions (the mount wall portion 44 and the reinforcing wall portion 45) overlapping each other. With this configuration, the upper rail 4 can be provided with improved rigidity, so that the seat bottom frame 3 can be fixed thereto with stability.

Although not illustrated in the drawings, the upper rail 4 is also provided at the right side, and engaged with the groove of the lower rail disposed at the right side of the seat bottom frame 3. The upper rail (not shown) provided at the right of the seat bottom frame 3 has a cross section laterally symmetric to that of the upper rail 4 shown in FIG. 2 provided at the left side of the seat bottom frame 3.

The seat bottom frame 3 is fixed to the upper rail 4, and mainly includes a substantially sheet-like side frame 30 which constitutes left and right frames, and a height adjustment mechanism 60 for adjusting a height of the side frame 30 (seating surface).

Figure 3:
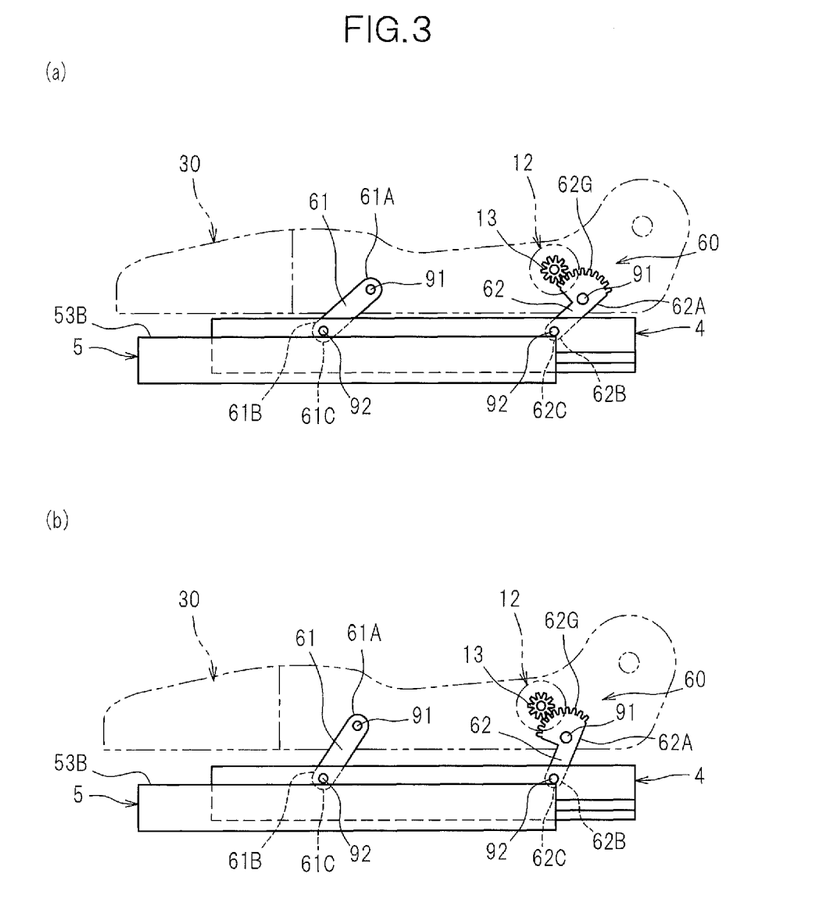
FIG. 3 is an explanatory diagram of a height adjustment mechanism, in which (a) shows the seat in a lowered position, and (b) shows the seat in a raised position.

As shown in FIG. 3 (a), (b), the height adjustment mechanism 60 includes a front link 61 and a rear link 62 as an example of a link member, and is configured such that upper portions 61A, 62A of the respective link members 61, 62 are pivotally connected to a side surface of the side frame 30, and lower portions 61B, 62B of the respective link members 61, 62 are pivotally connected to a side surface of the upper rail 4, so as to form a four-bar linkage by which the side frame 30 can be moved upward and downward relative to the upper rail 4.

To be more specific, rear links 62 are provided one at the left and one at the right (only one of which is illustrated), and the upper portion 62A of each one is connected to a side surface of the side frame 30 at a laterally outer side thereof using a pin 91 which forms a joint. The pin 91 is applied in such a manner that the rear link 62 is pivotally supported thereby, so that the rear link 62 can turn relative to the side frame 30. On the upper portion 62A of one rear link 62 at the left or at the right (at the left in the present embodiment), a substantially sectorial gear portion 62G is formed.

The lower portion 62B of the rear link 62 is connected (fixed) to a side surface of a laterally inner side of the upper rail 4 (mount wall portion 44) using a pin 92 which forms a joint. The pin 92 is applied in such a manner that the rear link is pivotally supported thereby, so that the rear link 62 can turn relative to the upper rail 4.

As shown in FIG. 2, in the present embodiment, a lower end 62C (the end facing to the inner top portion 53A of the seat bottom frame 3) of the rear link 62 is in a position lower than that of the outer top portion 53B of the lower rail 5. With this configuration, the height of the seat bottom (seat bottom frame 3) can be lowered in comparison with a configuration in which the seat bottom is fixed to the upper rail in a position higher than that of the top portion of the lower rail (for example, the configuration described in Patent Literature 1 mentioned above).

Figure 4:
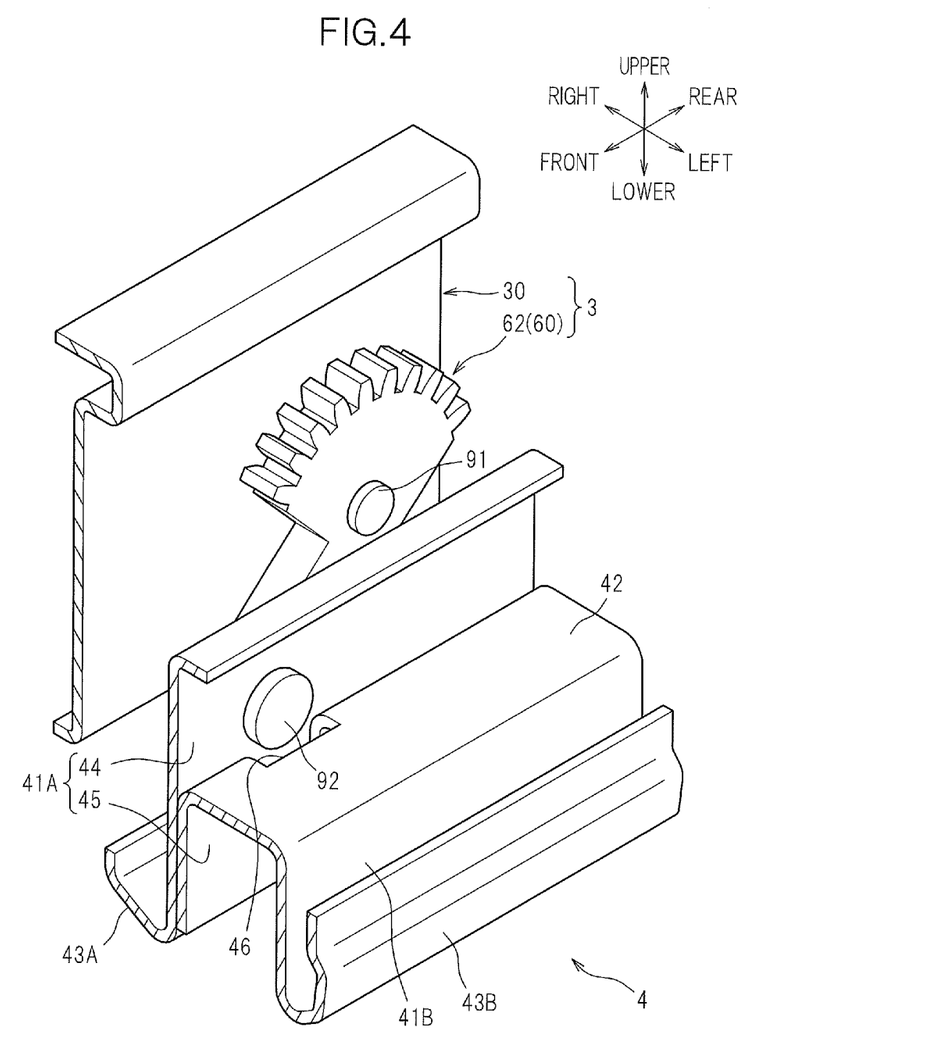
FIG. 4 is an enlarged perspective view showing an opening and therearound of an upper rail.

In the present embodiment, the pin 92 applied to fix the upper rail 4 and the rear link 62 (seat bottom frame 3) is disposed in such a position that a lower end 92A thereof is in a position lower than that of the upper wall 42 (a top surface of the upper wall 42) of the upper rail 4. As shown in FIG. 4, the upper rail 4 has an opening 46 (through hole) as an example of a clearance that is a portion thereof (to be more specific, the upper wall 42 and the reinforcing wall portion 45) recessed to avoid interference with the pin 92. With this configuration, in the present embodiment, the height of the seat bottom frame 3 can be further lowered.

As shown in FIG. 3 (a), (b), front links 61 are provided one at the left and one at the right (only one of which is illustrated), and the upper portion 61A of each one is connected, as with the case with the rear link 62, to a side surface of a laterally outer side of the side frame 30 using a pin 91, so that the front link 61 can turn relative to the side frame 30.

The lower portion 61B of the front link 61 as well is connected, as is the case with the rear link 62, to a side surface of a laterally inner side of the upper rail 4 using a pin 92, so that the front link 61 can turn relative to the upper rail 4. As with the case with the rear link 62, a lower end 61C of the front link 61 is in a position lower than that of the outer top portion 53B of the lower rail 5.

On the side frame 30 at the left or at the right (at the left in the present embodiment), an operation knob 12 having a gear 13 in mesh with the gear portion 62G of the rear link 62 is provided. When the gear 13 rotates by turning the operation knob 12, the rotation is transmitted to the gear portion 62G, and the rear link 62 is caused to turn around.

For example, when the operation knob 12 is operated from the state shown in FIG. 3 (a) to turn clockwise in the drawing, the rear link 62 is raised frontward. Since the rear link 62, side frame 30, front link 61 and upper rail 4 constitute a four-bar linkage, when the rear link 62 is raised frontward, the front link 61 is also raised frontward, and the side frame 30 is moved upward (see FIG. 3 (b)). In this way, the seating surface can be moved in a higher position.

On the other hand, when the operation knob 12 is operated from the state shown in FIG. 3 (b) to turn counterclockwise, the rear link 62 is tilted rearward. Then, the front link 61 is also tilted rearward, and thus the side frame 30 is moved downward (see FIG. 3 (a)). In this way the seating surface can be moved in a lower position. It is to be understood that the left and right links 61, 62 may be connected by pipes or the like so that the left and right links can be caused to turn around simultaneously.

With the above-described configuration, according to the present embodiment, the following advantages can be achieved.

Since the inner top portion 53A of the lower rail 5 is formed in a position lower than that of the outer top portion 53B, and the lower ends 61C, 62C of the respective links 61, 62 are disposed in positions lower than that of the outer top portion 53B, the height of the seat bottom frame 3 can be lowered, and thus further miniaturization in height can be achieved.

Since the seat bottom frame 3 (links 61, 62) is fixed directly to the side surface of the upper rail 4, the positioning accuracy in mounting the seat bottom fame 3 can be improved in a height direction and in a lateral direction, in comparison with a configuration in which the seat bottom frame 3 is fixed indirectly via any other member(s) to the upper rail 4.

Since the seat bottom frame 3 is fixed to a laterally inner side surface of the upper rail 4, the side frame 30, links 61, 62 and the like can be arranged at an inner side of the upper rail 4, and thus miniaturization in a lateral dimension can be achieved. Moreover, since the upper rail 4 and the lower rail 5 can be visually inspected from outside, the maintenance such as required to perform upon clogging with foreign matter or the like can be facilitated.

Since the links 61, 62 are connected directly to the upper rail 4, the positioning accuracy in mounting the links 61, 62 can be improved, and the operational stability of the links 61, 62 (height adjustment mechanism 60) can be improved.

Since the inner sidewall 41A of the upper rail 4 to which the seat bottom frame 3 is fixed is formed with two sheet-like portions (mount wall portion 44 and reinforcing wall portion 45) overlapping each other, the rigidity of the upper rail can be increased. Accordingly, the seat bottom frame 3 can be fixed with stability, and the operational stability of the links 61, 62 can be further improved.

Since the lower end 92A of the pin 92 is in a position lower than that of the upper wall 42 of the upper rail 4, and the opening 46 is formed in a portion of the upper rail 4, the height of the seat bottom frame 3 can be further lowered, and further miniaturization in height can be achieved.

Although the embodiment of the present invention has been described above, the present invention is not limited to the above-described embodiment. Specific configurations may be modified without departing from the gist of the present invention.

In the above-described embodiment, the lower end 92A of the pin 92 (part of the fastening member) is disposed in a position lower than that of the upper wall 42 (connecting wall) of the upper rail 4, but the present invention is not limited to this configuration; for example, the whole fastening member (in entirety) may be disposed in a position lower than the connecting wall. Moreover, in the above-described embodiment, the clearance or recessed portion is illustrated as the opening 46 (through hole), but the present invention is not limited to this configuration; for example, it may be configured as a dented portion.

In the above-described embodiment, the upper rail 4 is shown to include the inner sidewall 41A partly having a two-ply structure formed by welding two sheet-like parts (mount wall portion 44 and reinforcing wall portion 45) overlapping face-to-face, but the present invention is not limited to this configuration. For example, such a two-ply structure may be formed by bending and folding a single sheet. In the above-described embodiment, part of the inner sidewall 41A (the side wall to which the seat bottom is fixed) is provided with a two-ply structure, but the present invention is not limited to this configuration; for example, the whole sidewall to which the seat bottom is fixed may be configured to have a two-ply structure.

The configuration of the height adjustment mechanism 60 shown in the above-described embodiment (shape of each link 61, 62, arrangement and position of the operation knob 12, and the like) may be exemplary only, and the present invention is not limited to this configuration. For example, a gear portion may be formed on an upper portion of the front link, and an operation knob may be provided near the upper portion (gear portion) of the front link.

Figure 5:
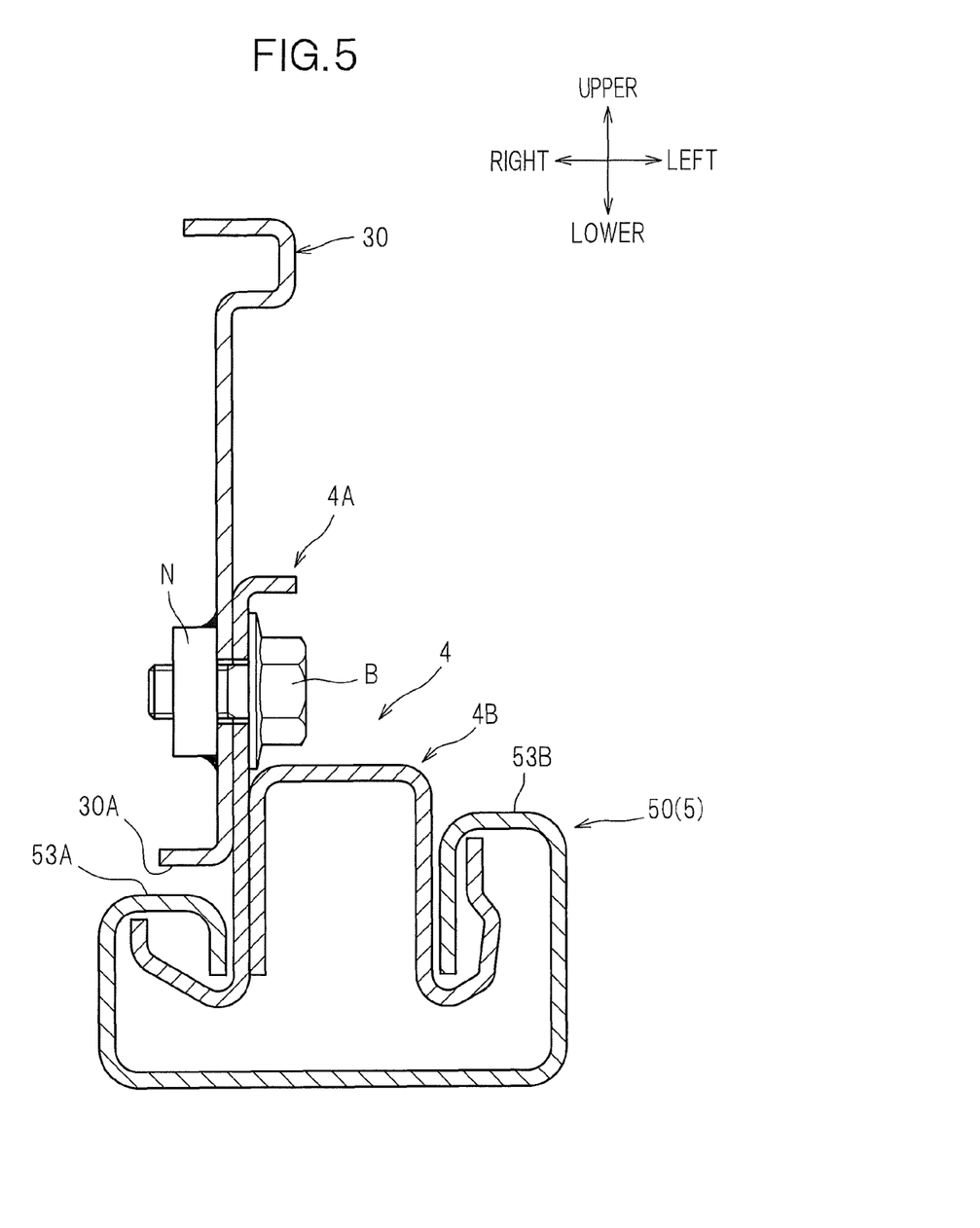
FIG. 5 is a diagram of a vehicle seat according to a modified embodiment, corresponding to the sectional view taken along the line II-II of FIG. 1.

In the above-described embodiment, the links 61, 62 (link members) are fixed to the upper rail 4, but the present invention is not limited to this configuration. For example, in a configuration where no height adjustment mechanism is provided, or the like, the side frame 30 may be fixed directly to the upper rail 4 by fastening with a bolt B and a nut N welded to an inside of the side frame 30, as shown in FIG. 5. It is to be understood that in the configuration as shown in FIG. 5, a lower end 30A (the end facing to a first surface of the seat bottom (the inner top portion 53A)) of the side frame 30 is in a position lower than that of the outer top portion 53B (second surface) of the lower rail 5.

Figure 6:
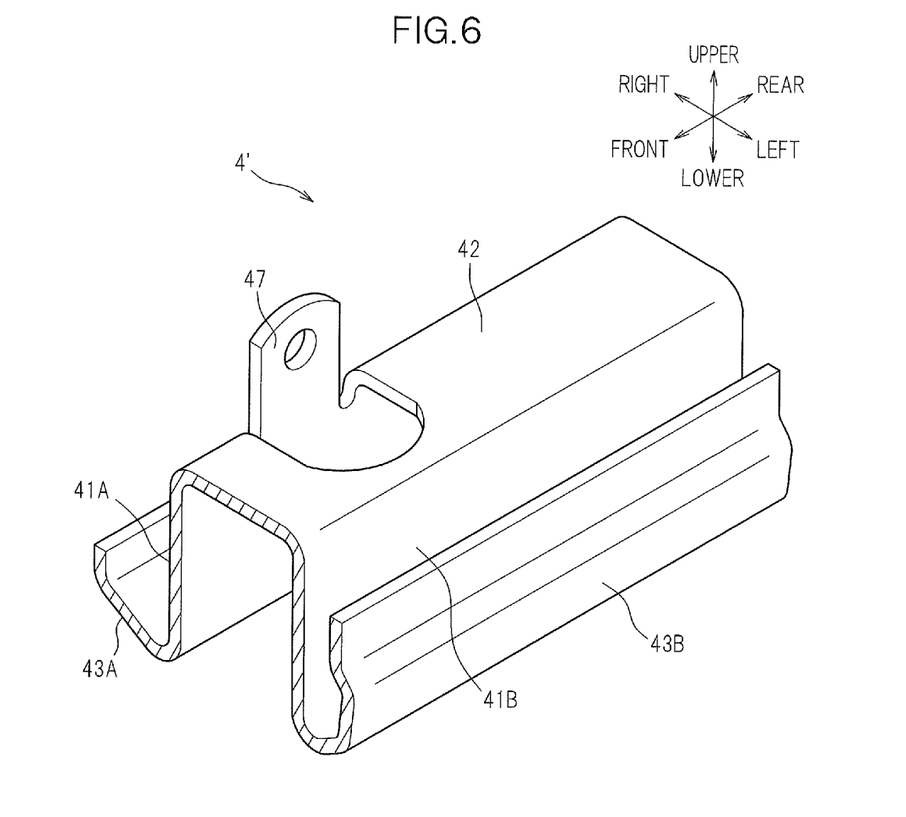
FIG. 6 is a perspective view of an upper rail according to a modified embodiment.

In the above-described embodiment, the upper rail 4 is composed of two parts: an inner rail portion 4A and an outer rail portion 4B, but the present invention is not limited to this configuration; for example, the upper rail 4 may be formed of a single metal sheet (composed of one part) like an upper rail 4' shown in FIG. 6. The upper rail 4' has a mount portion 47 shaped like a raised tab made by cutting and raising a part of the upper wall 42 to the right (laterally inward), so that the seat bottom can be fixed to the mount portion 47 by a pin, a bolt, or welding, etc. In accordance with the present invention, the seat bottom may be fixed to a sidewall (side surface) of the upper rail without providing the mount portion 47 described above.

In the above-described embodiment, the seat bottom frame 3 (seat bottom) is fixed to the side surface of the upper rail 4 at a laterally inner side thereof, but the present invention is not limited to this configuration, and the seat bottom may be fixed to a side surface of the upper rail at a laterally outer side thereof.

In the above-described embodiment, a seat for a car such as an automobile is illustrated by way of example as an application of a vehicle seat, but the present invention is not limited to this application, and can also be applied to any other type of vehicle seat, for example, a seat for a ship or for an aircraft.

The invention claimed is:

1. A vehicle seat slidable in a front-rear direction, comprising:
    a lower rail fixed on a floor of a vehicle, and configured to have a shape elongated in the front-rear direction and having a groove provided in a laterally central position;
    an upper rail configured to be engageable with the groove and slidable in the front-rear direction relative to the lower rail; and
    a seat bottom fixed to the upper rail via front and rear link members,
    wherein the seat bottom is fixed to a left or right side surface of the upper rail,
    wherein the lower rail has a pair of left and right upper surfaces between which the groove is disposed and of which a first surface is disposed on a side of the seat bottom and a second surface is on a side opposite to the first surface, the first surface being formed in a position lower than that of the second surface, and
    wherein lower ends of the front and rear link members are in a position lower than that of the second surface.

2. The vehicle seat according to claim 1, wherein the seat bottom is fixed to a laterally inner side surface of the upper rail.

3. The vehicle seat according to claim 1, wherein the seat bottom includes a side frame which constitutes a left or right frame, and the front and rear link members comprise part of a height adjustment mechanism for adjusting a height of the side frame, the front and rear link members being connected to a side of the side frame.

4. The vehicle seat according to claim 1, wherein the upper rail includes a sidewall to which the seat bottom is fixed, and at least part of the sidewall is formed with two sheet-like portions overlapping each other.

5. The vehicle seat according to claim 1, further comprising a fastening member with which the upper rail and the seat bottom are fixed together,
    wherein the upper rail includes a pair of sidewalls engageable with the groove, and a connecting wall connecting the pair of sidewalls,
    wherein at least part of the fastening member is disposed in a position lower than that of the connecting wall, and
    wherein the upper rail has a clearance that is a portion thereof recessed to avoid interference with the fastening member.

6. The vehicle seat according to claim 1, wherein the front and rear link members are connected to a laterally inner side surface of the upper rail and a laterally outer surface of the seat bottom.

7. The vehicle seat according to claim 6, wherein the laterally outer surface of the seat bottom to which the front and rear link members are connected is offset in an inner direction from the lower rail.

8. A vehicle seat slidable in a front-rear direction, comprising:
    a lower rail fixed on a floor of a vehicle, and configured to have a shape elongated in the front-rear direction and having a groove provided in a laterally central position, the lower rail having upward-facing first and second surfaces between which the groove is disposed;
    an upper rail configured to be engageable with the groove and slidable in the front-rear direction relative to the lower rail, the upper rail including a first sidewall, a second sidewall, and a connecting wall, the first and second sidewalls being separate from each other, the first sidewall including a first portion and a second portion, the first portion being opposed to the second sidewall, the second portion including an upwardly protruding portion extending upward beyond an upper end of the first portion, the connecting wall connecting the upper end of the first portion of the first sidewall and an upper end of the second sidewall; and
    a seat bottom having a lower end portion fixed to the upwardly protruding portion of the second portion of the first sidewall of the upper rail by a fastening member,
    wherein the first surface is formed in a position lower than that of the second surface, and
    wherein a lower end of the lower end portion of the seat bottom facing toward the first surface is in a position lower than that of the second surface.

9. The vehicle seat according to claim 8, wherein the second portion of the first sidewall further includes a downwardly extending portion extending downward from the upper end of the first portion along a first side surface of the first portion, wherein the first portion and the downwardly extending portion of the first sidewall of the second portion are sheet-like portions overlapping each other.

10. The vehicle seat according to claim 8, wherein at least part of the fastening member is disposed in a position lower than that of the connecting wall, and wherein the upper rail has a clearance recessed downward to allow the fastening member to be provided therein.

11. The vehicle seat according to claim 9, wherein the lower end portion of the seat bottom are lower end portions of front and rear link members.

12. The vehicle seat according to claim 11, wherein the fastening member comprises a pin pivotally supporting each of the lower end portions of the front and rear link members.

\* \* \* \* \*